(12) United States Patent
Eisen et al.

(10) Patent No.: US 10,664,275 B2
(45) Date of Patent: *May 26, 2020

(54) SPEEDING UP YOUNGER STORE INSTRUCTION EXECUTION AFTER A SYNC INSTRUCTION

(71) Applicant: International Business Machines Corporation, Armonk, NY (US)

(72) Inventors: Susan E. Eisen, Round Rock, TX (US); Hung Q. Le, Austin, TX (US); Bryan J. Lloyd, Austin, TX (US); Dung Q. Nguyen, Austin, TX (US); David S. Ray, Austin, TX (US); Benjamin W. Stolt, Austin, TX (US); Shih-Hsiung S. Tung, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/117,058

(22) Filed: Aug. 30, 2018

(65) Prior Publication Data

US 2019/0012175 A1 Jan. 10, 2019

Related U.S. Application Data

(63) Continuation of application No. 13/470,386, filed on May 14, 2012, now Pat. No. 10,067,765.

(51) Int. Cl.
*G06F 9/30* (2018.01)
*G06F 9/38* (2018.01)

(52) U.S. Cl.
CPC ........ *G06F 9/30087* (2013.01); *G06F 9/3824* (2013.01); *G06F 9/3834* (2013.01); *G06F 9/3857* (2013.01); *G06F 9/3861* (2013.01)

(58) Field of Classification Search
CPC ........................... G06F 9/30087; G06F 9/3834
See application file for complete search history.

(56) References Cited

U.S. PATENT DOCUMENTS 6,484,230 B1 * 11/2002 Konigsburg ........ G06F 9/30087
711/100
6,606,702 B1 8/2003 Guthrie et al.
(Continued)

OTHER PUBLICATIONS

U.S. Appl. No. 13/470,386, 2 pages.

*Primary Examiner* — Michael J Metzger
(74) *Attorney, Agent, or Firm* — Stephen J. Walder, Jr.; Nathan Rau

(57) ABSTRACT

Mechanisms are provided, in a processor, for executing instructions that are younger than a previously dispatched synchronization (sync) instruction is provided. An instruction sequencer unit of the processor dispatches a sync instruction. The sync instruction is sent to a nest of one or more devices outside of the processor. The instruction sequencer unit dispatches a subsequent instruction after dispatching the sync instruction. The dispatching of the subsequent instruction after dispatching the sync instruction is performed prior to receiving a sync acknowledgement response from the nest. The instruction sequencer unit performs a completion of the subsequent instruction based on whether completion of the subsequent instruction is dependent upon receiving the sync acknowledgement from the nest and completion of the sync instruction.

21 Claims, 8 Drawing Sheets

(56) References Cited

U.S. PATENT DOCUMENTS

| | | | |
|---|---|---|---|
| 6,691,220 B1* | 2/2004 | Guthrie | G06F 9/3836 |
| | | | 712/219 |
| 6,748,518 B1 | 6/2004 | Guthrie et al. | |
| 6,880,073 B2* | 4/2005 | Arimilli | G06F 9/30087 |
| | | | 712/235 |
| 7,991,981 B2* | 8/2011 | Arimilli | G06F 9/30032 |
| | | | 710/22 |
| 2009/0164734 A1* | 6/2009 | Robinson | G06F 13/1689 |
| | | | 711/134 |
| 2010/0268895 A1 | 10/2010 | Ghai et al. | |
| 2013/0305022 A1 | 11/2013 | Eisen et al. | |

* cited by examiner

SPEEDING UP YOUNGER STORE INSTRUCTION EXECUTION AFTER A SYNC INSTRUCTION

This application is a continuation of application Ser. No. 13/470,386, filed May 14, 2012, status awaiting publication.

BACKGROUND

The present application relates generally to an improved data processing apparatus and method and more specifically to mechanisms for speeding up the execution of younger store instructions occurring after a synchronization (sync) instruction.

In many known out-of-order processor architectures, synchronization (sync) instructions are used to enforce ordering for load instructions. The sync instruction is held as dispatched until the load miss queue (LMQ) of the load/store (L/S) unit of the processor is empty, i.e. all previous loads occurring prior to the sync instruction have completed. Once all of the previous loads are completed, the sync instruction is executed. The sync instruction and all younger store instructions, i.e. store instructions dispatched after the dispatching of the sync instruction, are placed in the store reorder queue (SRQ) and the sync instruction waits for it to be the next instruction to complete. When the sync instruction is at the next to complete (NTC) stage, it is sent to the nest, i.e. the logic outside the processor core, e.g., cache memory, system memory, disk or other storage devices, or the like. The nest is basically comprised of slower storage devices and circuitry than the logic and circuitry provided within the processor core. Essentially, the nest is comprised of devices, logic, and circuitry to which send data is sent and from which load data is received.

The younger store instructions in the SRQ wait in the SRQ until the older sync instruction completes. When the nest responds with a sync_ack response, indicating that they have acknowledged the sync instruction, the L/S unit finishes its processing of the sync instruction. The completion logic of the processor then performs its processing to complete the sync instruction. A completion pointer is then updated to point to the store instruction, i.e. the younger store that is now next to complete. Once the store instruction is completed, the SRQ can now send the store instruction to the nest. A similar operation is performed in response to younger load instructions with regard to a load reorder queue (LRQ).

It can be seen from the above that when there is a sync instruction in the SRQ (or the LRQ), younger store instructions (or load instructions) are stalled until the sync instruction is completed. This causes the processor to not perform as optimally as possible since the younger store instructions must wait in the SRQ.

SUMMARY

In one illustrative embodiment, a method, in a processor, for executing instructions that are younger than a previously dispatched synchronization (sync) instruction is provided. The method comprises dispatching, by an instruction sequencer unit of the processor, a sync instruction. The method further comprises sending the sync instruction to a nest of one or more devices outside of the processor. Moreover, the method comprises dispatching, by the instruction sequencer unit, a subsequent instruction after dispatching the sync instruction. The dispatching of the subsequent instruction after dispatching the sync instruction is performed prior to receiving a sync acknowledgement response from the nest. In addition, the method comprises performing, by the instruction sequencer unit, a completion of the subsequent instruction based on whether completion of the subsequent instruction is dependent upon receiving the sync acknowledgement from the nest and completion of the sync instruction.

In another illustrative embodiment, a processor is provided that comprises various hardware logic for performing operations for executing younger instructions after a sync instruction. In this illustrative embodiment, the processor comprises first hardware logic, in an instruction sequencer unit of the processor, configured to dispatch a sync instruction, and second hardware logic, in the instruction sequencer unit, configured to send the sync instruction to a nest of one or more devices outside of the processor. The processor further comprises third hardware logic, in the instruction sequencer unit, configured to dispatch a subsequent instruction after dispatching the sync instruction. The dispatching of the subsequent instruction after dispatching the sync instruction is performed prior to receiving a sync acknowledgement response from the nest. The processor also comprises fourth hardware logic, in the instruction sequencer unit, configured to perform a completion of the subsequent instruction based on whether completion of the subsequent instruction is dependent upon receiving the sync acknowledgement from the nest and completion of the sync instruction.

In yet another illustrative embodiment, an apparatus is provided that comprises a processor and a nest of one or more devices external to the processor. The processor comprises hardware logic configured to dispatch a sync instruction, send the sync instruction to the nest of one or more devices external to the processor, and dispatch a subsequent instruction after dispatching the sync instruction. The dispatching of the subsequent instruction after dispatching the sync instruction is performed prior to receiving a sync acknowledgement response from the nest. The processor further comprises hardware logic configured to perform a completion of the subsequent instruction based on whether completion of the subsequent instruction is dependent upon receiving the sync acknowledgement from the nest and completion of the sync instruction.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
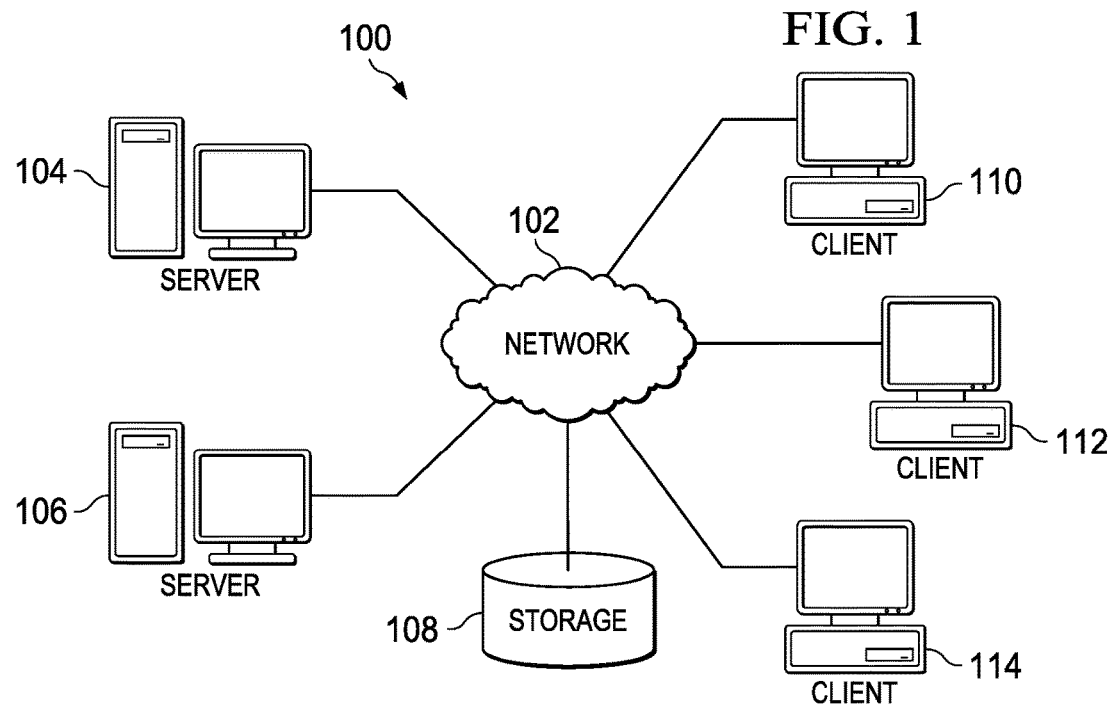
FIG. 1 is a pictorial representation of an example distributed data processing system in which aspects of the illustrative embodiments may be implemented.

The illustrative embodiments provide mechanisms for speeding up the execution of younger load and store instructions occurring after a synchronization (sync) instruction. The illustrative embodiments provide mechanisms to allow load and store instructions that are younger than a sync instruction to dispatch, execute, and complete before the sync_ack response is received from the nest. As a result, the younger store instructions can also be sent to the nest at a much earlier time than in previous processor architectures.

With the mechanisms of the illustrative embodiments, store instructions and load instructions that are younger than a sync instruction, as well as other subsequent instructions, are allowed to dispatch as soon as, or shortly after, the sync instruction is dispatched and prior to the sync acknowledgement response being received. The sync instruction does not have to wait for the load miss queue (LMQ) to drain and become empty before it can be executed. The sync instruction is finished by the load/store (L/S) unit as soon as it is put in the store reorder queue (SRQ), i.e. the L/S unit finishes the sync instruction without waiting for the sync_ack response from the nest. When the sync instruction is at a next to complete stage, it can complete and the following store instructions can be drained from the SRQ as soon as the store instructions reach the next to complete stage and the nest has responded with a sync acknowledgement response.

Younger load instructions can be executed, but are not permitted to complete, however, until the sync instruction has executed and completed. That is, after the sync instruction has executed and completed, the completion logic of the processor is allowed to complete all non-load/non-sync instructions younger than the sync instruction. When the load instruction is at the next to complete stage, it waits until the sync acknowledgment has been returned from the nest. After the nest has acknowledged that the sync instruction has been handled in the nest, the L/S unit checks for a snoop hit on the younger load instructions in the LRQ, i.e. an instruction that requests access to a same address or memory location as the younger load instruction. If there is not a snoop hit, then the load instruction can complete. If there is a snoop hit, then the L/S unit requests a flush at the point of the oldest snooped load instruction that is younger than the sync instruction. If the load instruction that is next to complete is flushed out, the processor will then refetch and dispatch the load instruction in a normal fashion.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
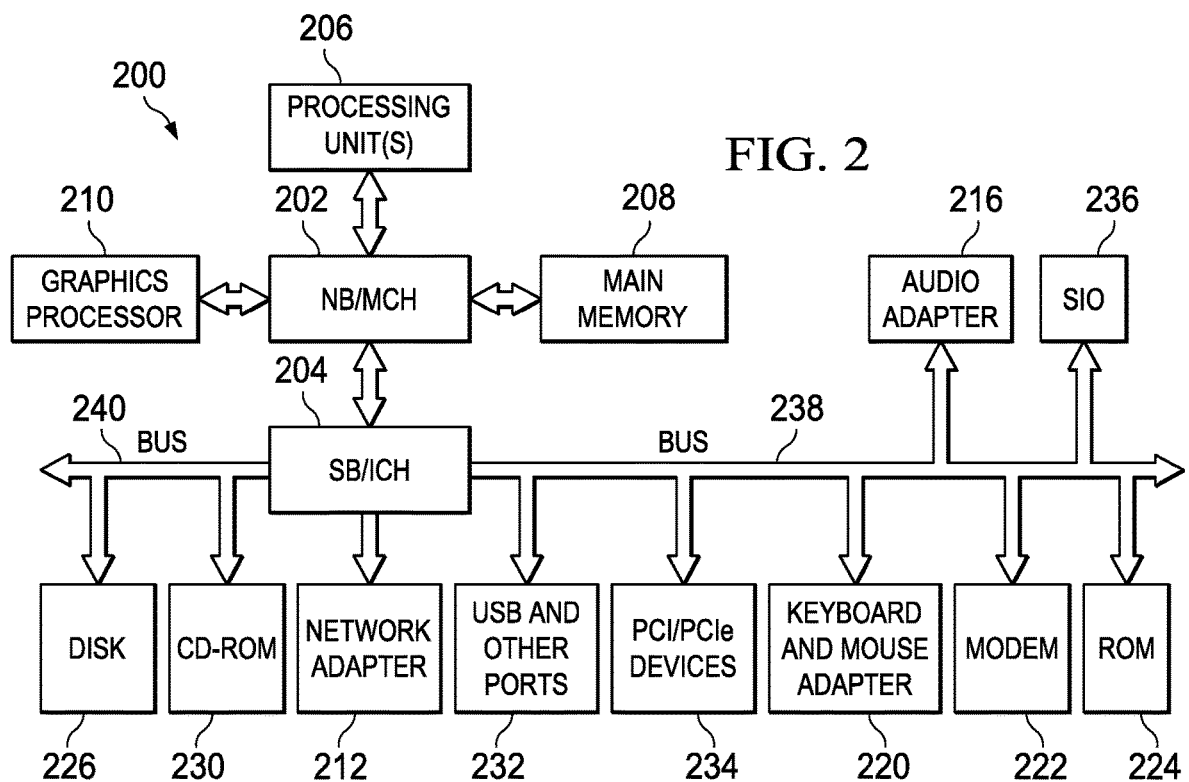
FIG. 2 is a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HUD 226 and CD-ROM drive 230 connect to SB/ICH 1204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
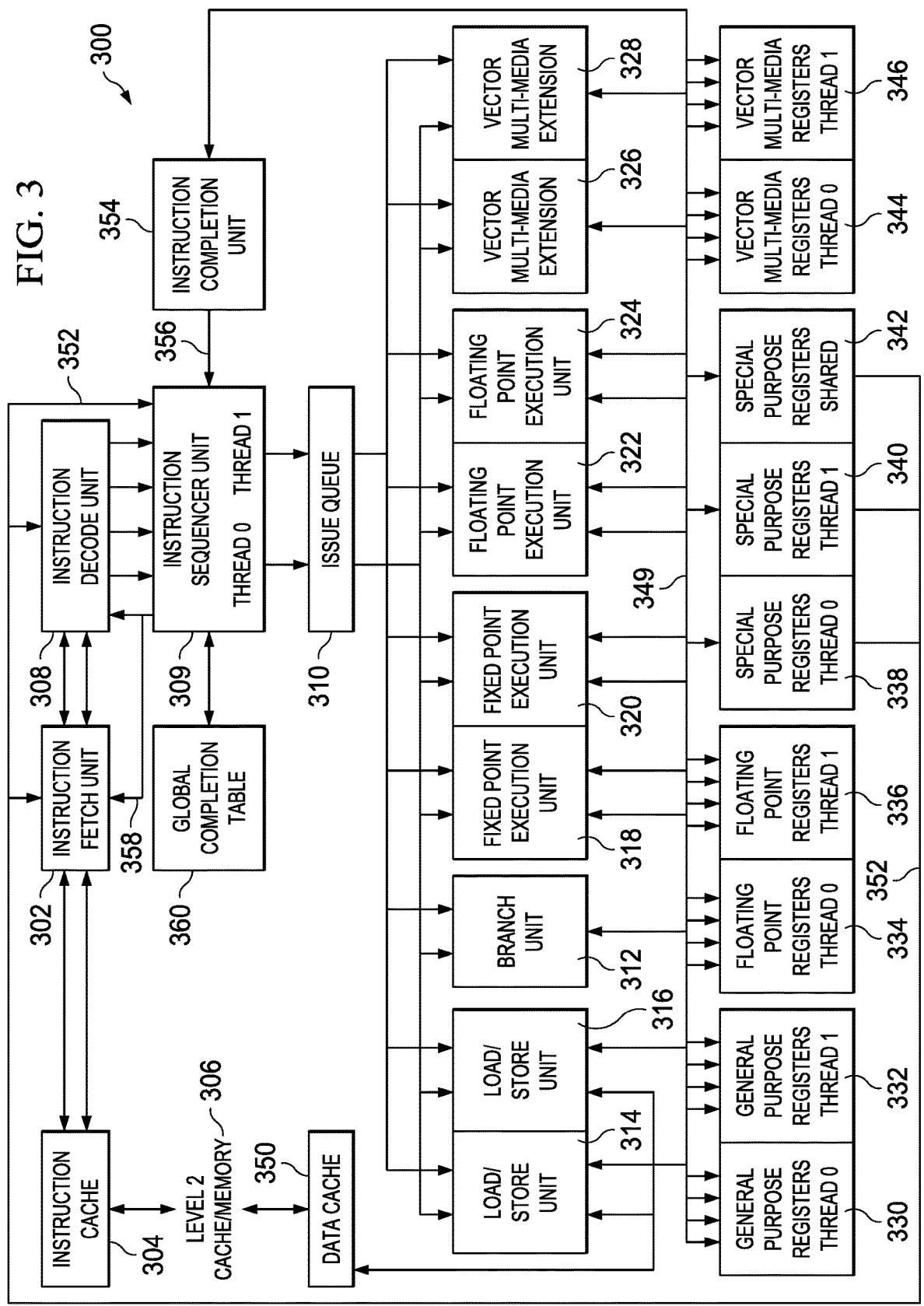
FIG. 3 is a block diagram of a processor architecture in which exemplary aspects of the illustrative embodiments may be implemented.

Referring to FIG. 3, an exemplary block diagram of a conventional dual threaded processor design showing functional units and registers is depicted in accordance with an illustrative embodiment. Processor 300 may be implemented as processing unit 206 in FIG. 2 in these illustrative examples. Processor 300 comprises a single integrated circuit superscalar microprocessor with dual-thread simultaneous multi-threading (SMT) that may also be operated in a single threaded mode. Accordingly, as discussed further herein below, processor 300 includes various units, registers, buffers, memories, and other sections, all of which are formed by integrated circuitry. Also, in an illustrative embodiment, processor 300 operates according to reduced instruction set computer (RISC) techniques.

As shown in FIG. 3, instruction fetch unit (IFU) 302 connects to instruction cache 304. Instruction cache 304 holds instructions for multiple programs (threads) to be executed. Instruction cache 304 also has an interface to level 2 (L2) cache/memory 306. IFU 302 requests instructions from instruction cache 304 according to an instruction address, and passes instructions to instruction decode unit 308. In an illustrative embodiment, IFU 302 may request multiple instructions from instruction cache 304 for up to two threads at the same time. Instruction decode unit 308 decodes multiple instructions for up to two threads at the same time and passes decoded instructions to instruction sequencer unit (ISU) 309.

Processor 300 may also include issue queue 310, which receives decoded instructions from ISU 309. Instructions are stored in the issue queue 310 while awaiting dispatch to the appropriate execution units. For an out-of order processor to operate in an in-order manner, ISU 309 may selectively issue instructions quickly using false dependencies between each instruction. If the instruction does not produce data, such as in a read after write dependency, ISU 309 may add an additional source operand (also referred to as a consumer) per instruction to point to the previous target instruction (also referred to as a producer). Issue queue 310, when issuing the producer, may then wakeup the consumer for issue. By introducing false dependencies, a chain of dependent instructions may then be created, whereas the instructions may then be issued only in-order. ISU 309 uses the added consumer for instruction scheduling purposes and the instructions, when executed, do not actually use the data from the added dependency. Once ISU 309 selectively adds any required false dependencies, then issue queue 310 takes over and issues the instructions in order for each thread, and outputs or issues instructions for each thread to execution units 312, 314, 316, 318, 320, 322, 324, 326, and 328 of the processor. This process will be described in more detail in the following description.

In an illustrative embodiment, the execution units of the processor may include branch unit 312, load/store units (LSUA) 314 and (LSUB) 316, fixed point execution units (FXUA) 318 and (FXUB) 320, floating point execution units (FPUA) 322 and (FPUB) 324, and vector multimedia extension units (VMXA) 326 and (VMXB) 328. Execution units 312, 314, 316, 318, 320, 322, 324, 326, and 328 are fully shared across both threads, meaning that execution units 312, 314, 316, 318, 320, 322, 324, 326, and 328 may receive instructions from either or both threads. The processor includes multiple register sets 330, 332, 334, 336, 338, 340, 342, 344, and 346, which may also be referred to as architected register files (ARFs).

An ARF is a file where completed data is stored once an instruction has completed execution. ARFs 330, 332, 334, 336, 338, 340, 342, 344, and 346 may store data separately for each of the two threads and by the type of instruction, namely general purpose registers (GPRs) 330 and 332, floating point registers (FPRs) 334 and 336, special purpose registers (SPRs) 338 and 340, and vector registers (VRs) 344 and 346. Separately storing completed data by type and by thread assists in reducing processor contention while processing instructions.

The processor additionally includes a set of shared special purpose registers (SPR) 342 for holding program states, such as an instruction pointer, stack pointer, or processor status word, which may be used on instructions from either or both threads. Execution units 312, 314, 316, 318, 320, 322, 324, 326, and 328 are connected to ARFs 330, 332, 334, 336, 338, 340, 342, 344, and 346 through simplified internal bus structure 349.

In order to execute a floating point instruction, FPUA 322 and FPUB 324 retrieves register source operand information, which is input data required to execute an instruction, from FPRs 334 and 336, if the instruction data required to execute the instruction is complete or if the data has passed the point of flushing in the pipeline. Complete data is data that has been generated by an execution unit once an instruction has completed execution and is stored in an ARF, such as ARFs 330, 332, 334, 336, 338, 340, 342, 344, and 346. Incomplete data is data that has been generated during instruction execution where the instruction has not completed execution. FPUA 322 and FPUB 324 input their data according to which thread each executing instruction belongs to. For example, FPUA 322 inputs completed data to FPR 334 and FPUB 324 inputs completed data to FPR 336, because FPUA 322, FPUB 324, and FPRs 334 and 336 are thread specific.

During execution of an instruction, FPUA 322 and FPUB 324 output their destination register operand data, or instruction data generated during execution of the instruction, to FPRs 334 and 336 when the instruction has passed the point of flushing in the pipeline. During execution of an instruction, FXUA 318, FXUB 320, LSUA 314, and LSUB 316 output their destination register operand data, or instruction data generated during execution of the instruction, to GPRs 330 and 332 when the instruction has passed the point of flushing in the pipeline. During execution of a subset of instructions, FXUA 318, FXUB 320, and branch unit 312 output their destination register operand data to SPRs 338, 340, and 342 when the instruction has passed the point of flushing in the pipeline. Program states, such as an instruction pointer, stack pointer, or processor status word, stored in SPRs 338 and 340 indicate thread priority 352 to ISU 309. During execution of an instruction, VMXA 326 and VMXB 328 output their destination register operand data to VRs 344 and 346 when the instruction has passed the point of flushing in the pipeline.

Data cache 350 may also have associated with it a non-cacheable unit (not shown) which accepts data from the processor and writes it directly to level 2 cache/memory 306. In this way, the non-cacheable unit bypasses the coherency protocols required for storage to cache.

In response to the instructions input from instruction cache 304 and decoded by instruction decode unit 308, ISU 309 selectively dispatches the instructions to issue queue 310 and then onto execution units 312, 314, 316, 318, 320, 322, 324, 326, and 328 with regard to instruction type and thread. In turn, execution units 312, 314, 316, 318, 320, 322, 324, 326, and 328 execute one or more instructions of a particular class or type of instructions. For example, FXUA 318 and FXUB 320 execute fixed point mathematical operations on register source operands, such as addition, subtraction, ANDing, ORing and XORing. FPUA 322 and FPUB 324 execute floating point mathematical operations on register source operands, such as floating point multiplication and division. LSUA 314 and LSUB 316 execute load and store instructions, which move operand data between data cache 350 and ARFs 330, 332, 334, and 336. VMXA 326 and VMXB 328 execute single instruction operations that include multiple data. Branch unit 312 executes branch instructions which conditionally alter the flow of execution through a program by modifying the instruction address used by IFU 302 to request instructions from instruction cache 304.

Instruction completion unit 354 monitors internal bus structure 349 to determine when instructions executing in execution units 312, 314, 316, 318, 320, 322, 324, 326, and 328 are finished writing their operand results to ARFs 330, 332, 334, 336, 338, 340, 342, 344, and 346. Instructions executed by branch unit 312, FXUA 318, FXUB 320, LSUA 314, and LSUB 316 require the same number of cycles to execute, while instructions executed by FPUA 322, FPUB 324, VMXA 326, and VMXB 328 require a variable, and a larger number of cycles to execute. Therefore, instructions that are grouped together and start executing at the same time do not necessarily finish executing at the same time. "Completion" of an instruction means that the instruction is finishing executing in one of execution units 312, 314, 316, 318, 320, 322, 324, 326, or 328, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 354 monitors for the completion of instructions, and sends control information 356 to ISU 309 to notify ISU 309 that more groups of instructions can be dispatched to execution units 312, 314, 316, 318, 320, 322, 324, 326, and 328. ISU 309 sends dispatch signal 358, which serves as a throttle to bring more instructions down the pipeline to the dispatch unit, to IFU 302 and instruction decode unit 308 to indicate that it is ready to receive more decoded instructions. While processor 300 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor using a pipeline technology.

Figure 4:
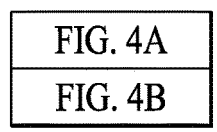
FIGS. 4A and 4B together illustrate an example load/store unit in which aspects of the illustrative embodiments may be implemented.
Figure 4A:
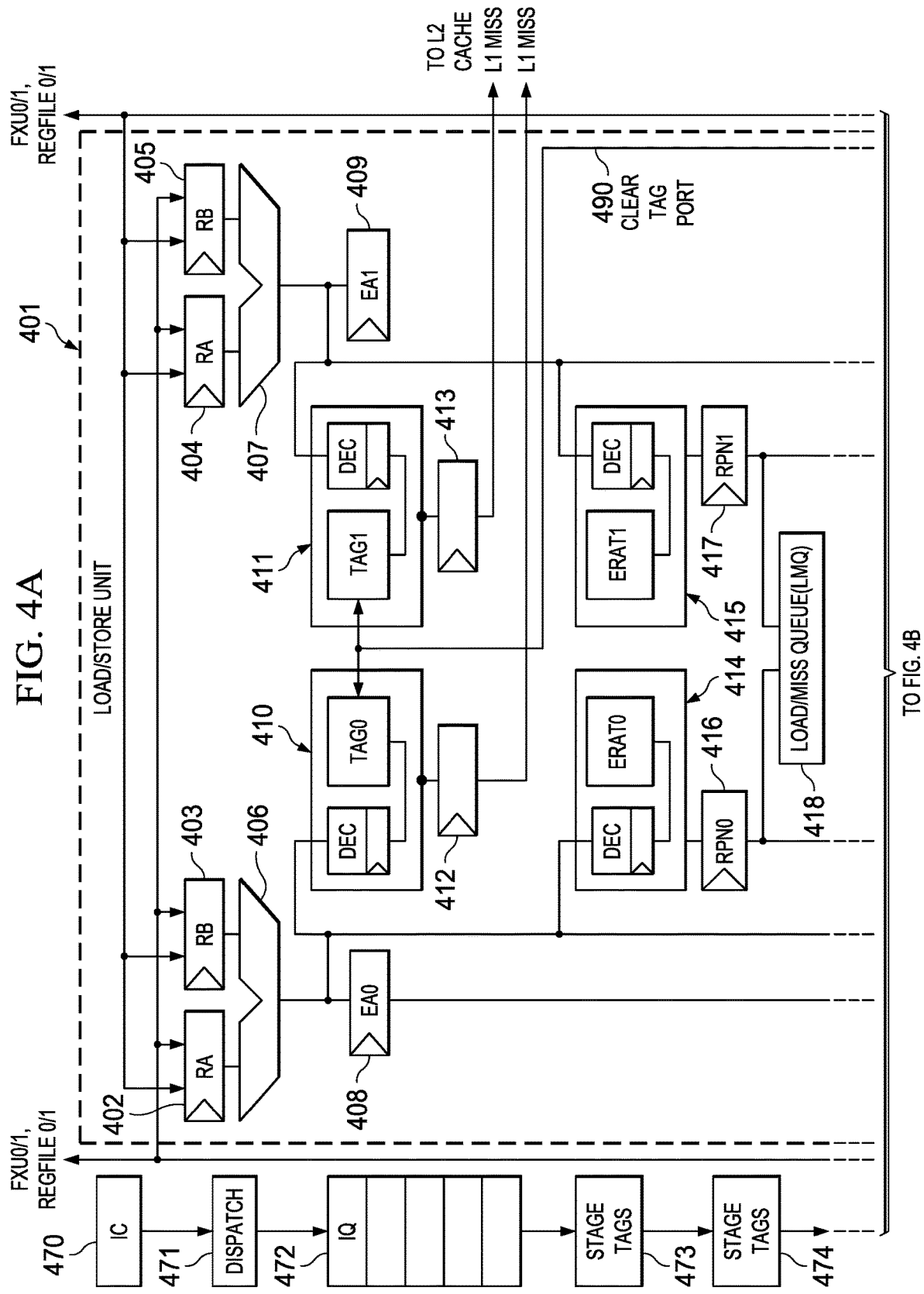
Figure 4B:
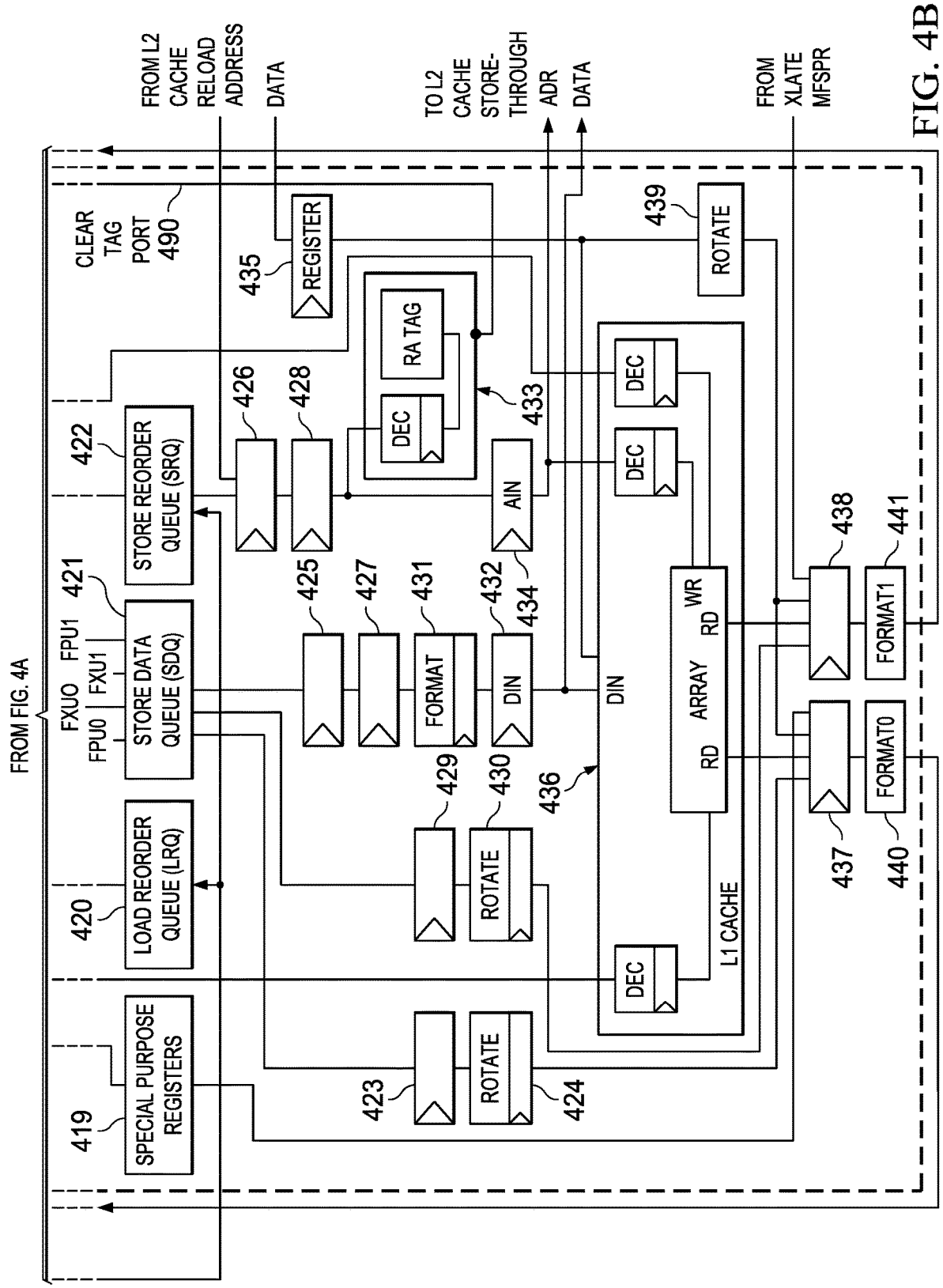

FIGS. 4A and 4B together illustrate one example of a load/store (L/S) unit 401 configured in accordance with the present invention. L/S unit 401 may be, for example, one or more of the L/S units 314 or 316 in the processor architecture of FIG. 3. Alternatively, a single L/S unit may be implemented in a processor architecture in which the aspects of the illustrative embodiments may be implemented. The L/S unit 401 is responsible for handling all load instructions (for loading data from memory structures) and store instructions (for storing data to memory structures) executed by the processor in which it is present.

In the depicted example, the L/S unit 401 has two pipelines so that two load or store instructions can be issued per machine cycle. Registers 402-405 receive instructions from fixed point units (FXUs) 0 and 1 (not shown) in a manner well-known in the art. 64-bit adder 406 adds operands received from registers 402 and 403, while 64-bit adder 407 adds operands from registers 404 and 405 to produce a pair of 64-bit effective addresses (EAs). These effective addresses are outputted to registers 408 and 409, respectively. These registers 408 and 409 then both feed LMQ (load miss queue) 418, LRQ (load reorder queue) 420 and SRQ (store reorder queue) 422, which all need a portion of the EA in addition to the real address from registers 416 and 417 to perform address checking. Additionally, the effective addresses are decoded to access tag arrays 410 and 411 to determine if there is a hit or a miss within L1 cache 436 (FIG. 4B). If there is a miss, i.e. the data is not present in the L1 cache 436, then the addresses are passed through registers 412 and 413 and sent to the L2 cache (not shown).

Furthermore, the effective addresses are sent from adders 406 and 407 to be decoded and to access the effective real address translator (ERAT) arrays 414 and 415, respectively, which output translated addresses through registers 416 and 417.

Further, the effective addresses from adders 406 and 407 access the L1 cache 436 for the load operation after being decoded by the decoders within the L1 cache 436. If there is a hit in the L1 cache 436, i.e., the data is present in the L1 cache 436, then the data is read out of the L1 cache 436 into registers 437, 438, and formatted by formatters 440, 441, and returned on the result bus to be sent to a register file (RegFile) (not shown). The cache line read out of L1 cache 436 is also returned into the registers 402-405 for operations that are dependent on the result as an operand.

Essentially, the three cycles performed within L/S unit 401 are the execute cycle (where the addition is performed), the access cycle (where access to the arrays is performed), and the result cycle (where the formatting and forwarding of data is performed). If there is a miss in the cache, the request is then sent down to the L2 cache (not shown). The load miss queue (LMQ) 418 waits for the load data to come back from the L2 cache (not shown). The data associated with that cache line is loaded into the L1 cache 436.

These load operations can be performed speculatively and out of order. Store instructions are also executed out of order. Store instructions are divided into store address and store data instructions. The individual instructions are executed as soon as their operands are available and an execution unit is available to execute them. Store address instructions are translated and put in the store recorder queue (SRQ) 422. Store data instructions read the FXU (fixed point unit) or FPU (floating point unit) register file and send the result to be written in the store data queue (SDQ) 421 to wait their turn to write to the L1 cache 436. Therefore, store instructions are executed out of order, but written into the L1 cache 436 in order.

The SRQ 422 keeps track of store instructions that have been executed. SRQ 422 maintains the store instructions in the queue and determines when the data is available in the SDQ 421 and when the store instruction is next to complete. The store to the L1 cache 436 is then completed.

Cache lines within the L1 cache 436 are accessed based on the effective address of the cache line. The RA tag array 433 keeps track of where in the L1 cache 436 a cache line was written. The format block 431 takes the data from the SDQ 421 and rotates it properly to write into the correct byte positions in the L1 cache 436 upon execution of the store instruction.

Rotate blocks 424 and 430 are utilized for store forwarding. Therefore, if there is a store instruction that is sitting in the store queue and has not been written into the cache/memory subsystem yet because it is not next to complete, and then a younger load instruction is received that needs that data, the data will be forwarded to the load instruction being executed. To simplify store forwarding, and store writes, when data is transferred to the SDQ 421, the data is rearranged so that the data corresponding to the location in memory of the store address is written into the first byte of the SDQ 421 entry, the store address +1 into the second byte, etc. The data is arranged in the order written to memory, but is byte-aligned. When the data is written to the L1 cache 436, it is rotated (blocks 424 and 430) so that the data is double-word aligned.

Rotate block 439 is utilized to rotate data received from the L2 cache (not shown) in response to an L1 cache miss, for forwarding the data from the L2 cache on to the result bus for forwarding to the proper register file. Block 419 contains a number of special purpose registers to store data as a result of special purpose register instructions and read data from these registers so they get into the normal pipeline.

Register 435, as with many of the registers 423, 425-429, and 437-438 are implemented for timing purposes to stage data from the L2 cache (not shown). Format blocks 440 and 441 format (or shift) cache data into the proper byte positions for the load result to the register file.

As mentioned above, sync instructions are used in L/S units to enforce ordering of load instructions in an out-of-order processor. The presence of the sync instruction in the load miss queue (LMQ) 418 causes younger load and store instructions to have to wait until completion of the sync instruction before they can be dispatched to the nest, i.e. the logic elements, storage devices, and other circuitry exterior to the processor core from which load data is received and to which store data is sent by the processor core. As a result, the load and store instructions are not executed as efficiently as may be otherwise possible due to the wait period waiting for a sync acknowledgement response from the nest.

With the illustrative embodiments, the wait period for dispatching load instructions (loads) and store instructions (stores) to the nest is virtually eliminated by allowing these instructions to dispatch to the nest prior to receiving the sync acknowledgement response back from the nest. Stores are permitted to complete prior to completion of the sync instruction (sync) while loads must wait for completion of the sync, i.e. a sync acknowledgement being returned. When a load is ready to complete, a check is made as to whether there were any snoop hits on any of the waiting younger loads (younger than the sync) and if so, then a flush is generated at the point of the oldest snooped load that is younger than the sync.

Referring again to FIG. 3, with the illustrative embodiments, the issuance of instructions by the instruction sequencer unit 309 via the issue queue 310 is performed in a normal fashion with no serialization required. Thus, the instructions may be issued out-of-order. That is, the sync instructions are issued as normal with no serialization and the load/store instructions that are younger than the sync instruction are also issued in a normal fashion with no serialization such that they may be issued in an out-of-order manner.

The L/S unit 314, 316 executes and completes sync instructions in a normal fashion as well. That is, the L/S unit 314, 316 places the sync instruction in the store reorder queue (SRQ) 422 and the sync instruction is sent to the nest when completed. The L/S unit 314, 316 then waits for the sync acknowledgement (sync_ack) response from the nest. When the nest sends the sync_ack response to the L/S unit 314, 316, the L/S unit 314, 316 searches the load reorder queue (LRQ) 420 for a snoop hit. The L/S unit 314, 316 will forward the sync_ack response and any flush request for the snoop hit to the instruction sequencer unit 309. The flush request will occur at the oldest snooped load instruction that is younger than the sync instruction. The sync_ack response and the flush request can come from the same cycle. The flush request cannot be sent after the sync_ack response is sent to the instruction sequencer unit 309. If there is no snoop hit, the L/S unit 314, 316 sends the sync_ack response to the instruction sequencer unit 309 but holds sending the sync_ack response to the instruction sequencer unit 309 until an oldest-younger load instruction has completed.

With regard to instruction completion, the instruction sequencer unit 309 comprises logic that stops or stalls automatic completion of an instruction or group of instructions if a trouble_bit in an entry of the global completion table 360 corresponding to the instruction or group of instructions is set. Moreover, exception handling logic (not shown) of the instruction sequencer unit 309 maintains a sync_ack_pending bit (not shown) that is set on any sync instruction completion and reset when receiving a sync_ack response from the L/S unit 314, 316. If a sync instruction is a next to complete instruction, or is in a group of instructions that are next to complete, then if the sync_ack_pending bit is not set, i.e. sync_ack_pending=0, the sync instruction is allowed to complete and the sync_ack_pending bit is set, i.e. sync_ack_pending=1. If the sync_ack_pending bit is set, then the completion of the sync instruction is held until the sync_ack_pending bit is reset to a non-set state, i.e. reset to 0. This addresses a situation where there is a subsequent sync instruction dispatched after a previous sync instruction has already been dispatched but not yet acknowledged by the nest.

If a load instruction is the next to complete, or is in a group of instructions that is next to complete, then if the sync_ack_pending bit is not set, the instruction or group of instructions is permitted to complete. If the sync_ack_pending bit is set, then completion of the sync instruction is held until the sync_ack_pending bit is reset to a non-set state, i.e. sync_ack_pending=0.

With regard to flush handling, the L/S unit 314, 316 can request a flush of a load instruction that is younger than the sync instruction using the existing flush request mechanisms of the processor architecture. The flush cannot be requested after the sync_ack of the older sync instruction is sent to the instruction sequencer unit 309. This helps to avoid race conditions. Moreover, when an instruction or group of instructions is flushed (from any source, not just the L/S units 314, 316), the sync_dependent bit is read from the global completion table 360 and used to reset the younger_load_dispatch bit to a set state, i.e. younger_load_dispatch=1, at the dispatch stage.

Figure 5:
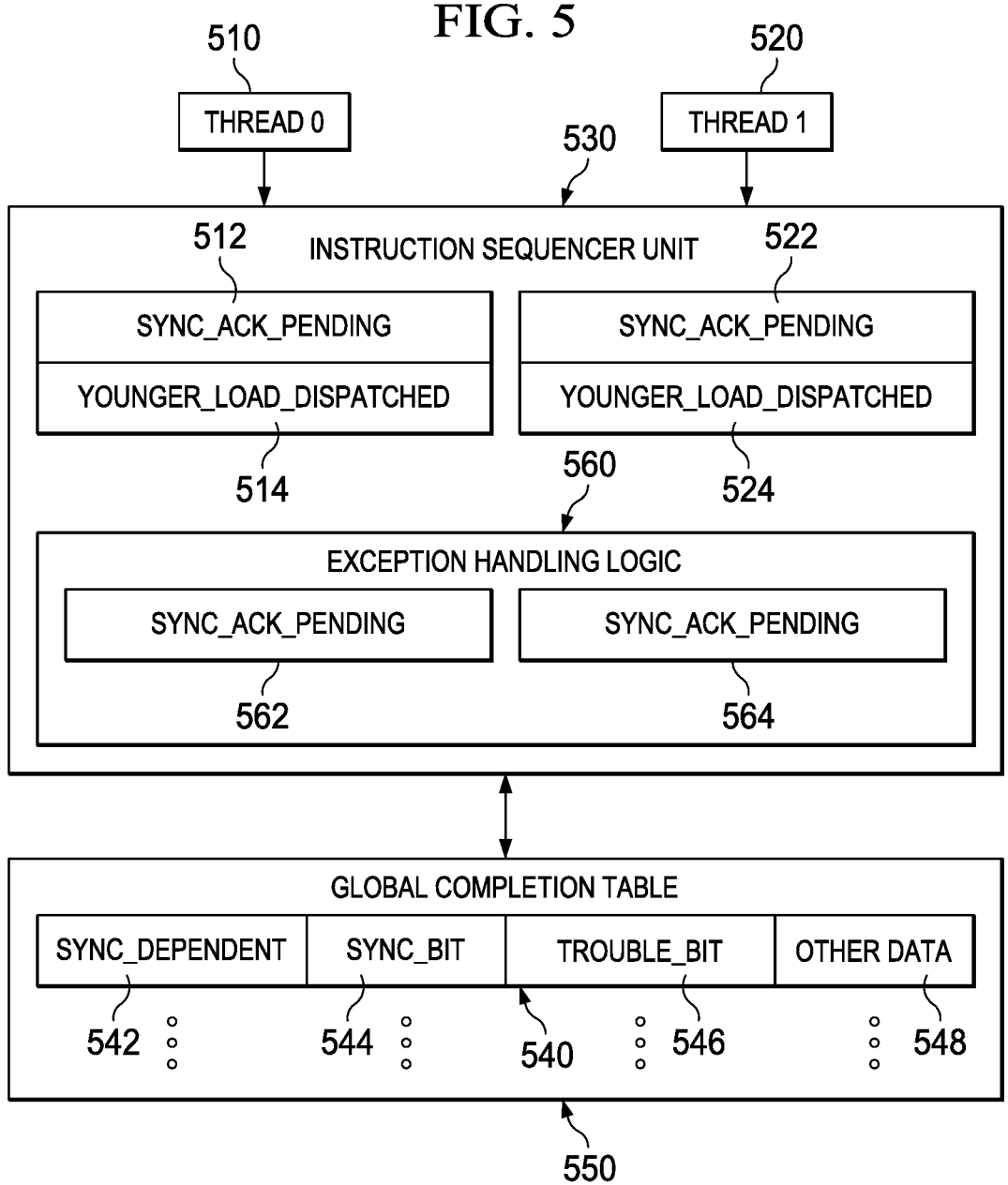
FIG. 5 is a block diagram illustrating an operation of some of the primary operational elements for implementing the mechanisms of the illustrative embodiments.

FIG. 5 is a block diagram illustrating an operation of some of the primary operational elements for implementing the mechanisms of the illustrative embodiments. As shown in FIG. 5, each thread 510 and 520 has associated status bit registers 512, 514 and 522, 524, which may be provided in an instruction sequencer unit 530 (which may be instruction sequencer unit 309 in FIG. 3), for example, for indicating whether a sync instruction and/or or younger load instruction has been dispatched for this thread. That is, status bit registers 512 and 522 store a sync_pending status bit that identifies whether a sync instruction has been dispatched and is currently pending. The status bit registers 514 and 524 store a younger_load_dispatched status bit that identifies whether a load instruction has been dispatched after a sync instruction which is still pending.

In addition, a global completion table 550, which may be the same as global completion table 360 in FIG. 3 for example, has entries 540 that include status bits 542-546 for tracking sync instruction dependencies, in addition to other global completion table entry information 548 typically found in known architectures. The status bits 542-546 identify instructions or groups of instructions having a sync instruction present, and identify for appropriate instructions/groups of instructions a need to stall completion of the instruction or group of instructions when certain conditions are present as described above and hereafter.

Status bit 542 is a sync_dependent status bit that specifies whether a corresponding instruction or group of instructions is dependent upon a previously dispatched sync instruction, i.e. the instruction or group of instructions is younger than a previously dispatched sync instruction. Status bit 544 is a sync_bit status bit that specifies whether a corresponding instruction or group of instructions comprises a sync instruction. The status bit 546 is a trouble_bit status bit that specifies whether completion of the corresponding instruction or group of instructions is to be stalled pending completion of a sync instruction upon which a load instruction in the instruction or group of instructions is dependent.

Figure 6:
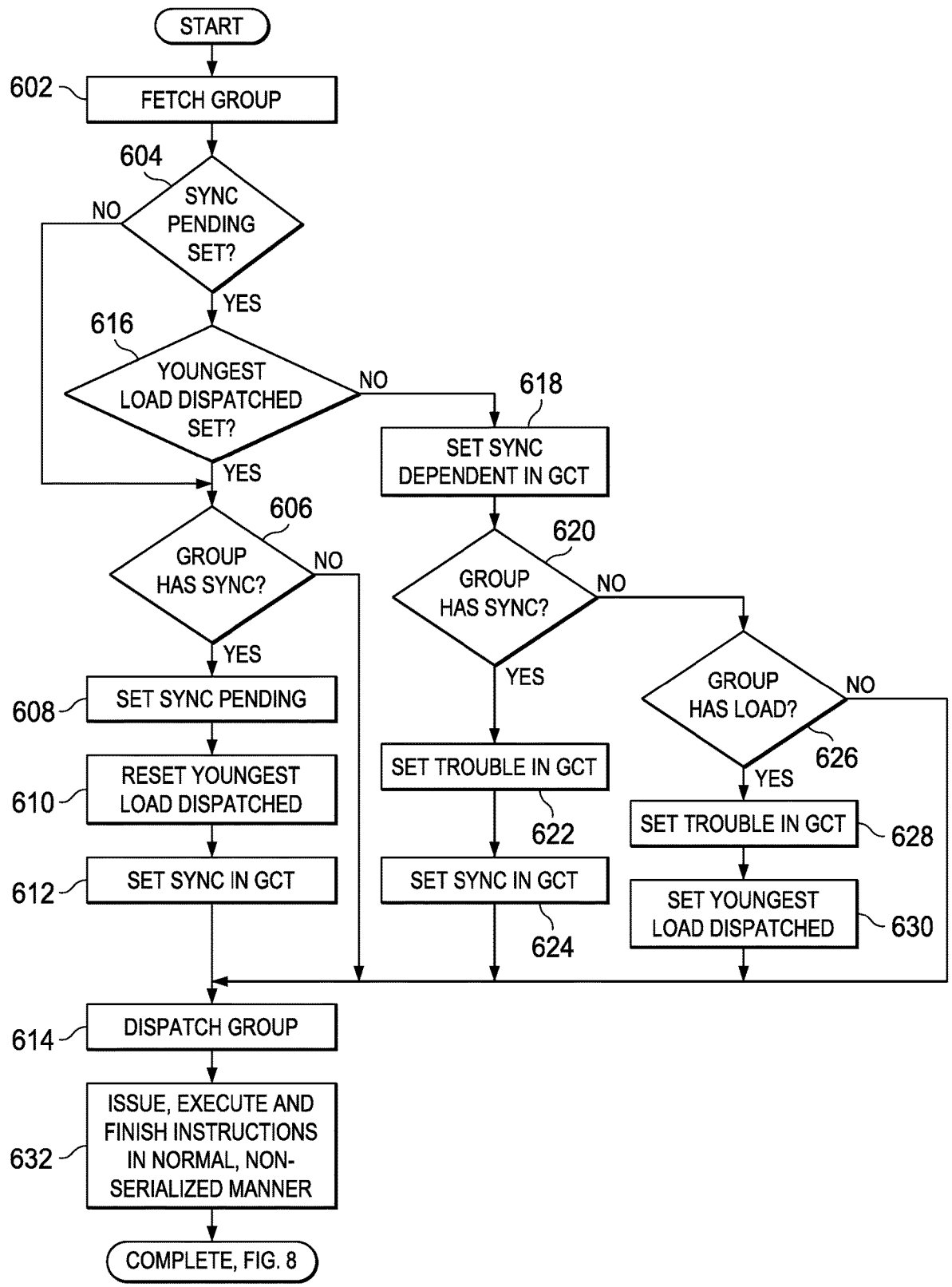
FIG. 6 is a flowchart outlining an example operation for dispatching instructions in accordance with one illustrative embodiment.

FIG. 6 is a flowchart outlining an example operation for dispatching instructions in accordance with one illustrative embodiment. The operations shown in FIG. 6 will be described with continued reference to elements of FIGS. 3-5. It should be appreciated that the operations described in FIG. 6 may be implemented in logic and circuitry of the various elements of FIGS. 3-5 as set forth hereafter.

As shown in FIG. 6, the operation starts with an instruction being fetched by an instruction fetch unit 302 and sent to the instruction sequencer unit 309 in a normal fashion, ready to be dispatched (step 602). Further behavior depends on whether or not the sync_pending bit 512 is already set (step 604), regardless of what types of instructions are in the group to be dispatched.

The sync_pending status bit 512 is used to indicate that there is an outstanding sync instruction in the processor core. It is used to mark, in the global completion table 550, all instructions or groups of instructions after the sync instruction, up to and including the first load instruction or first instruction group containing a load instruction, to indicate that these younger instructions are dependent on an older sync instruction. After the first load instruction is marked, all instructions younger than the load instruction are not marked as dependent upon the sync instruction using this sync_pending status bit 512. What is meant by "marking" the groups of instructions is that bits are set in the global completion table to indicate dependencies on the sync instruction, e.g., the sync_dependent bits 542 of entries in the global completion table 550 that correspond to younger instructions or groups of instructions may be set to indicate the dependency on a previously dispatched sync instruction.

If the sync_pending bit is not set, and the instruction is a sync instruction (step 606), the instruction sequencer unit 309 sets the sync_pending status bit 512 (step 608) so that this status bit may be used as a basis for marking subsequent instructions following the sync as being dependent upon the sync instruction in the global completion table 550, i.e. setting the sync_dependent bit 542 of an entry corresponding to the instruction or instruction group associated with the instruction. As shown in FIG. 5 above, this bit along with the younger_load_dispatched bit exist for each thread of execution. Thus, for the architecture shown in FIG. 3, there would be a sync_pending bit 512 and younger_load_dispatched bit 514 for each of the two threads being handled by the processor architecture.

Continuing to step 610, the sync instruction then causes the younger_load_dispatched status bit 514 to be reset. The younger_load_dispatched status bit 514 is used to indicate if a younger load instruction has been dispatched after the sync instruction or not and will be covered in further detail below.

Processing continues with setting the sync bit 544 in the global completion table 550 (step 612) before finally dispatching the group in step 614. The sync status bit 544 is set for an instruction or group of instructions if the instruction or group of instructions comprises a sync instruction. The global completion table 550 performs a logic OR of the sync bits and performs a logic OR of the result with the sync_ack_pending hit 562 (discussed hereafter) to keep the sync_pending bit 512 set to 1 in the dispatch stage 471. With these bits set the group dispatches normally (step 614).

Returning now to step 604, if the sync_pending bit was already set, the younger_load_dispatched status bit 514 must be checked in step 616 to determine if a load instruction has already been dispatched after the sync instruction. The younger_load_dispatched status bit 514 is only used if the sync_pending status bit 512 is set for the thread, i.e. sync_pending=1. If the younger_load_dispatched status bit 514 is set, i.e. younger_load_dispatched=1, then a load instruction that is younger than the previous sync instruction has been dispatched and has set the trouble_bit 546 in the global completion table 550. The trouble_bit 546 is again, a bit that is set with regard to an instruction group that indicates that the instruction group has a dependent load instruction that is dependent on the completion of previously dispatched sync instruction and thus, the completion of the instruction group needs to be stalled until completion of the sync instruction. The global completion table does not set the trouble_bit 546 for subsequent younger loads and does not need to set the sync_dependent bit for subsequent younger instructions as they are no longer dependent on the sync instruction. Hence, if the younger_load_dispatched status bit is already set to 1, then processing can continue at step 606, in the same manner as if the sync_pending status bit 512 was not set in the first place.

If the younger_load_dispatched status bit 514 is not set, i.e. younger_load_dispatched=0, then a load instruction that is younger than the sync instruction has not been dispatched and has not set a trouble_bit 546 in the global completion table 540. This means subsequent instructions are dependant on the sync instruction, but instead of stalling, the instruction sequencer unit 309 continues to dispatch instructions after the sync instruction in a normal fashion without waiting for a sync_ack response back from the nest. Each instruction or group of instructions that are dispatched while the younger_load_dispatched status bit 514 for the thread is not set will have the sync_dependent bit 542 set in the corresponding entry of the global completion table 540 for the instruction or group of instruction (step 618).

A determination is made as to whether the instruction, or group of instructions, contain another sync instruction (step 620) that behaves in a dependent manner on the younger_load_dispatched bit. That is, if the younger_load_dispatched bit is not set for the thread, i.e. younger_load_dispatched=0, the trouble_bit 544 will be set in the global completion table 550 for the instruction or group of instructions containing the sync instruction (step 622). This is to ensure that the sync instruction cannot complete until the previous sync instruction has been completed and acknowledged. In addition, the sync instruction must set the sync bit in the global completion table (step 624) in the same fashion as step 612.

If group of instructions does not contain a sync instruction (step 620), step 626 then determines if the group contains a load instruction. The first instruction or group of instructions that contains a load instruction dispatched after the sync instruction will set the trouble_bit 546 of the corresponding entry in the global completion table 540 (step 628) so that the completion of this instruction or group of instructions may be stalled or stopped. As previously discussed, this has been determined by looking at the younger_load_dispatched bit 514 and the sync_pending bit 512 for the thread in steps 604 and 616. That is, if the sync_pending bit 512 for the thread is set, indicating that a sync instruction has been dispatched, and the younger_load_dispatched bit 514 has not been set, then this is the first load instruction or group of instructions containing a load instruction following the sync instruction and the corresponding trouble_bit 546 is set in the entry of the global completion table 540. The load instruction must also set the younger_load_dispatched bit 514 (step 630) to ensure that subsequent instructions are no longer marked as being dependant on the previous sync instruction.

Once all the appropriate status bits are set as previously outlined, the instructions are dispatched and issued in a normal, non-serialized manner (step 632). Any groups or instructions dispatched when sync_pending=0 (step 604) that also did not contain a sync instruction (step 606) are dispatched normally without changing any status bit or writing any status bits to the global completion table 550.

Figure 7:
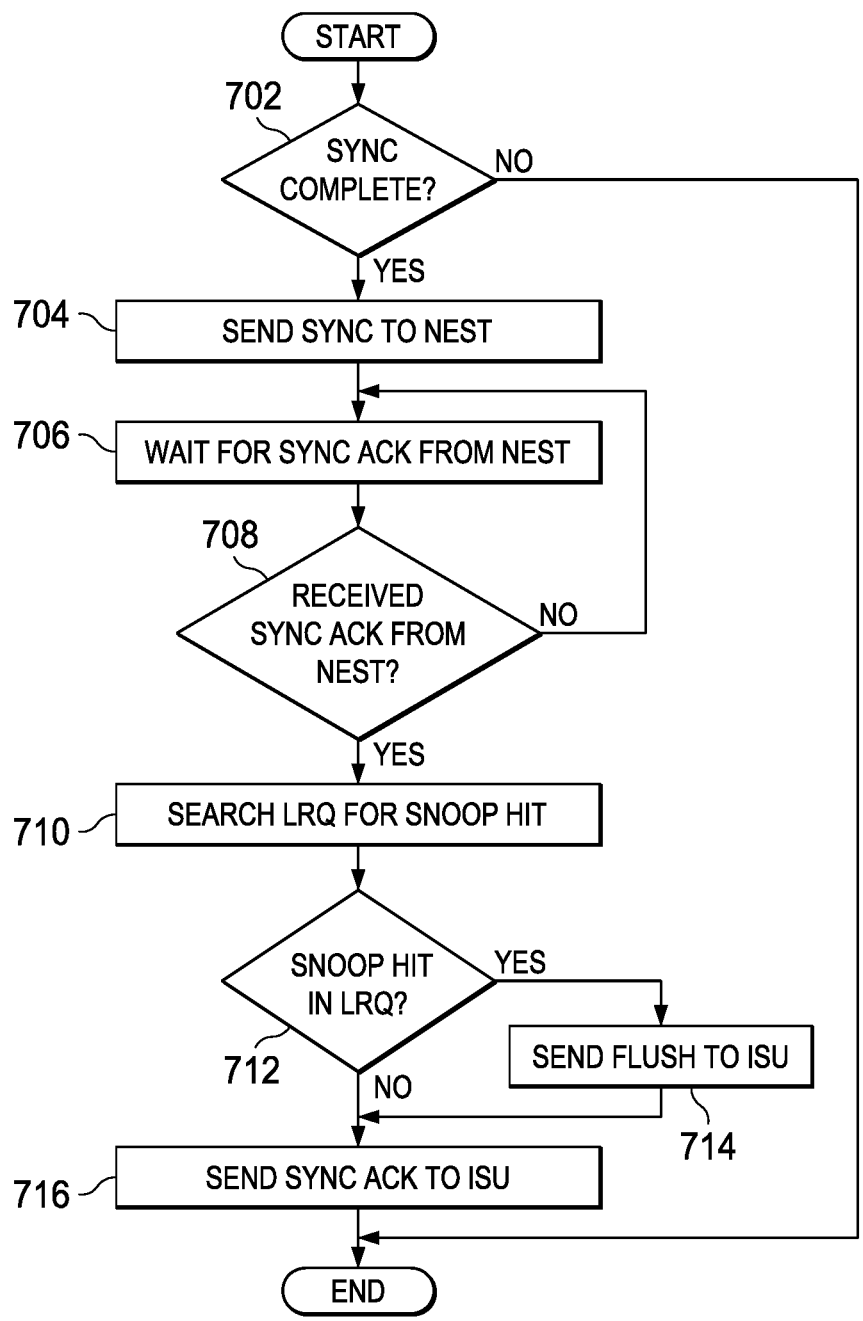
FIG. 7 is an example flowchart outlining an example operation for performing instruction completion in accordance with one illustrative embodiment.

FIG. 7 is an example flowchart outlining an example operation for the load/store unit 401, with regard to handling sync instructions. Load, store, and sync instructions are issued to the load/store unit which places sync instructions in its store reorder queue (SRQ) and sends the sync instructions to the nest (step 702) when they are completed (step 704), thereafter awaiting a sync_ack response from the nest (step 706). In response to a sync_ack response being received from the nest in step 708, the L/S unit searches the load reorder queue (LRQ) for any snoop hits (step 710). In response to a snoop hit being present (step 712) in the load reorder queue (LRQ), the L/S unit sends a flush request (step 714) with the sync_ack response (step 716) to the instruction sequencer unit requesting a flush at a point in the program execution where the oldest snooped load that is younger than the sync instruction is present. In response to the flush request, the instruction sequencer unit reads the sync_dependent bit 542 for the instruction or instruction group that is being flushed from a corresponding entry in the global completion table 550 and resets the younger_load_dispatch bit to 0 based on the sync_dependent bit (step 804 in FIG. 8).

In response to their not being a snoop hit in step 712, the L/S unit sends only the sync_ack response to the instruction sequencer unit (step 716). In response to receiving the sync_ack response from the L/S unit, the instruction sequencer unit performs instruction completion operations as described hereafter with reference to FIG. 8.

Figure 8:
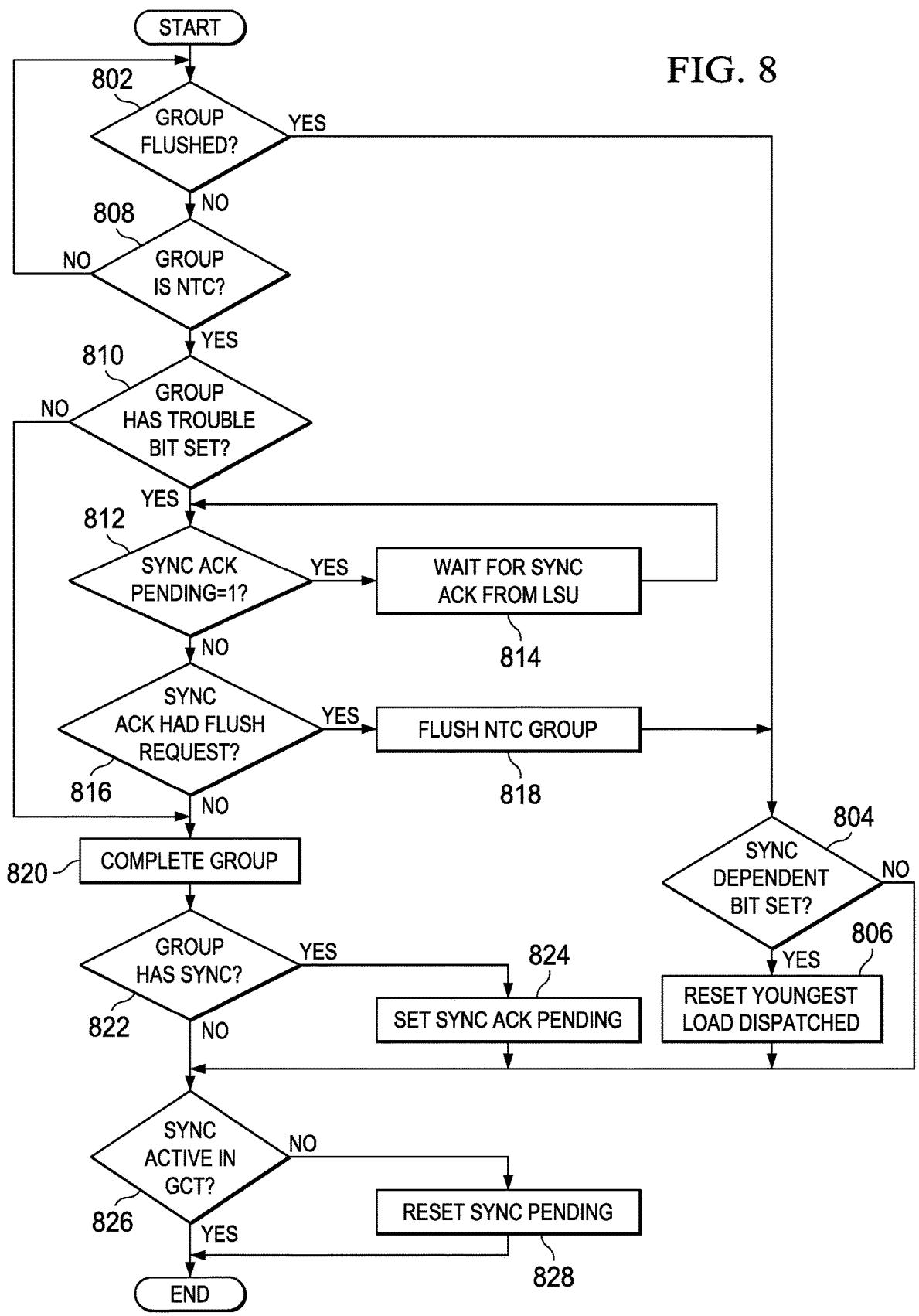
FIG. 8 is an example flowchart outlining an example operation for performing instruction completion in accordance with one illustrative embodiment.

FIG. 8 is an example flowchart outlining an example operation for performing instruction completion in accordance with one illustrative embodiment. The instruction sequencer unit 309 constantly monitors if groups have been flushed (step 802) and if so, determines if the sync_dependent bit 542 of the group has been set (step 804). If the sync_dependent bit 542 is set, then the flushed group is younger than a sync instruction, but older than the first load or subsequent sync instruction dispatched after the original sync instruction. The sync_dependent bit 542 is sent back to the dispatch logic (step 806) in order to reset the younger_load_dispatched bit 514 to 0. This will ensure that any further dispatches after the flush will be treated as being dependent on the original sync instruction. If an instruction or group of instructions is not flushed, it must wait until it becomes next-to-complete (NTC) (step 808). Once the instruction or group of instructions becomes next-to-complete, the trouble bit 546 stored in the global completion table 550 is examined to determine if the completion must stop due to the instruction or group of instructions being dependant on a previous sync instruction for which no sync_ack has been received from the L/S unit. If the trouble bit 546 is set the instruction sequencer unit 309 awaits a sync_ack response from the L/S unit (step 814). This may involve maintaining and looking at the state of a sync_ack_pending bit that is set when a sync instruction completes and is reset when a syn_ack is received from the L/S unit, for example. A determination is made as to whether a sync_ack_pending bit 562 is set, e.g., sync_ack_pending=1 (step 812). If the sync_ack_pending bit 562 is set, then completion of the sync instruction, or group of instructions that include a sync instruction, is stalled until the sync_ack_pending bit 562 is changed to a non-set state (step 812). If the sync_ack_pending bit 562 is not set, the instruction must determine if a previous sync_ack was accompanied by a flush request from the L/S unit (step 816). If such a flush request was received then the next-to-complete group must be flushed, as the data may have been modified by an earlier sync instruction. Once the flush is processed in step 818, the sync_dependent bit 542 must be examined in step 804 in order reset the younger_load_dispatched bit 514 as necessary in step 806. If there is no flush request, the instruction or group of instructions can be completed normally (step 820).

If the next to complete instruction did not have a trouble_bit 446 set, then the instruction or group of instructions completes in a normal fashion (step 820). It should be noted above, that store instructions are not stalled by the mechanisms of the illustrative embodiments. That is, store instructions are permitted to be dispatched and completed even if a sync_ack response has not been received from the nest. Thus, store instructions may be dispatched and completed as quickly and efficiently as possible. It is only sync instructions and load instructions that are handled such that the dependencies on sync instructions are processed appropriately.

Once a group has completed, if the group contains a sync instruction (step 822) then it must set the sync_ack_pending bit 562 in order to ensure that younger instructions that are dependent on the sync instruction are stalled until the sync_ack is received from the L/S unit (step 824). Further, when a group either completes or is flushed, the total number of pending sync instructions may change. In step 826 the sync bits 544 of all the active groups on the global completion table are ORed together with any sync_ack_pending state 562 to determine if there is an active sync instruction on a given thread. If there is no active sync instruction the sync_pending bit 512 can be reset to 0. At this point the operation terminates.

Thus, the illustrative embodiments provide mechanisms for speeding up the execution of load and store instructions by permitting these instructions to be dispatched prior to receiving a sync acknowledgement response back from the nest. Moreover, store instructions are permitted to complete prior to receiving the sync acknowledgement response from the nest. Load instructions that are dependent upon a previously dispatch sync instruction are handled appropriately so as to ensure proper ordering of loads based on the sync instruction. As a result, the mechanisms of the illustrative embodiments increase the dispatch and completion speeds of load and store instructions that follow a sync instruction.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a processor, for executing instructions that are younger than a previously dispatched synchronization (sync) instruction, comprising:

dispatching, by an instruction sequencer unit of the processor, a sync instruction;

sending the sync instruction to a nest of one or more devices outside of the processor;

dispatching, by the instruction sequencer unit, a subsequent instruction after dispatching the sync instruction, wherein the dispatching of the subsequent instruction after dispatching the sync instruction is performed prior to receiving a sync acknowledgement response from the nest; and performing, by the instruction sequencer unit, a completion of execution of the subsequent instruction and update of an architected state by committing results of the execution of the subsequent instruction to memory, based on whether completion of the subsequent instruction is dependent upon receiving the sync acknowledgement from the nest and completion of the sync instruction, wherein the subsequent instruction is one of a store instruction or a load instruction, and wherein:

in response to the subsequent instruction being a store instruction, performing completion of execution of the subsequent instruction and update of the architected state comprises completing execution of the store instruction and updating the architected state by committing results of the execution of the store instruction to memory, after completion of the sync instruction but prior to receiving the sync acknowledgement from the nest, and in response to the subsequent instruction being a load instruction, performing completion of execution of the subsequent instruction and update of the architected state comprises delaying completion of the execution of the subsequent instruction until after completion of the sync instruction and after receiving the sync acknowledgement from the nest, wherein performing completion of execution of the subsequent instruction and updating of the architected state further comprises determining whether a younger load instruction was dispatched while the sync instruction is pending, and updating a global completion table to indicate the subsequent instruction is dependent upon the sync instruction acknowledgement in response to a younger load instruction not having been dispatched after the sync instruction.

2. The method of claim 1, wherein, in response to the subsequent instruction being a load instruction and in response to receiving the sync acknowledgement from the nest, performing completion of execution of the subsequent instruction and update of the architecture state further comprises:

checking, by a load store unit of the processor, for a snoop hit on the load instruction;

in response to there not being a snoop hit on the load instruction, completing execution of the load instruction; and in response to there being a snoop hit on the load instruction, requesting, by the load store unit, a flush of a processor pipeline at a point of an oldest snooped load instruction that is younger than the sync instruction.

3. The method of claim 1, wherein all subsequent instructions that are non-load/non-sync instructions younger than the sync instruction are permitted to complete execution and update the architected state without waiting to receive the sync acknowledgement.

4. The method of claim 1, wherein:

dispatching, by an instruction sequencer unit of the processor, a sync instruction further comprises setting a sync pending status bit; and dispatching, by the instruction sequencer unit, a subsequent instruction after dispatching the sync instruction further comprises setting a status bit corresponding to the dispatched subsequent instruction.

5. The method of claim 4, wherein:

performing a completion of execution of the subsequent instruction and update of the architected state comprises determining if a next to complete instruction is a load instruction or a sync instruction;

in response to a next to complete instruction being a load instruction or a sync instruction, determining if the sync pending status bit is set or not; and completing, or stalling completion, of execution of the subsequent instruction and updating the architected state based on results of determining if the sync pending status bit is set or not.

6. The method of claim 5, wherein if the sync pending status bit is set, then completion of execution of the subsequent instruction and update of the architected state is stalled until the sync acknowledgement pending bit is reset.

7. The method of claim 5, wherein if the sync pending status bit is not set, then completion of execution of the subsequent instruction and update of the architected state is performed and the sync acknowledgement bit is reset.

8. The method of claim 1, wherein updating the architected state comprises committing complete data generated by execution of the subsequent instruction to one or more architected register files (ARFs) of the memory.

9. The method of claim 1, further comprising, in response to dispatching the sync instruction, setting a sync_pending status bit to indicate that there is an outstanding sync instruction that has not been acknowledged, wherein determining whether a younger load instruction was dispatched while the sync instruction is pending and updating a global completion table further comprises:

determining whether the sync_pending status bit is set;

determining whether a younger_load_dispatched bit is set or not set, wherein the younger_load_dispatched bit is set in response to a load instruction being dispatched after the sync instruction is dispatched by the instruction sequencer unit; and in response to determining that the sync_pending status bit is set, and the younger_load_dispatched bit is not set, setting a sync_dependent bit in a global completion table in association with the subsequent instruction to thereby indicate that the subsequent instruction is dependent upon the sync instruction acknowledgement.

10. The method of claim 9, wherein performing a completion of execution of the subsequent instruction and update of the architected state further comprises, in response to determining that the sync_pending status bit is not set, or in response to determining that the sync_pending status bit is set and the younger_load_dispatched bit is set:

determining whether a group of instructions corresponding to the subsequent instruction comprises a sync instruction; and in response to the group of instructions comprising a sync instruction, setting the sync_pending status bit to a set state, resetting the younger_load_dispatched bit to a not set state, and setting a sync status bit in the global completion table to a set state, wherein the sync status bit indicates that the corresponding group of instructions comprises a sync instruction.

11. The method of claim 10, further comprising dispatching the group of instructions and executing the group of instructions in a non-serialized manner.

12. The method of claim 9, wherein performing a completion of execution of the subsequent instruction and update of the architected state further comprises, in response to determining that the sync_pending status bit is set and the younger_load_dispatched bit is not set:

determining whether a group of instructions corresponding to the subsequent instruction comprises a sync instruction; and in response to the group of instructions comprising a sync instruction, setting a trouble_bit in an entry in the global completion table corresponding to the group of instructions to ensure that a sync instruction in the group of instructions cannot complete until a previous sync instruction has been completed and acknowledged.

13. The method of claim 9, wherein performing a completion of execution of the subsequent instruction and update of the architected state further comprises, in response to determining that the sync_pending status bit is set and the younger_load_dispatched bit is not set:
  determining whether a group of instructions corresponding to the subsequent instruction comprises a sync instruction;
  in response to determining that the group of instructions corresponding to the subsequent instruction does not comprise a sync instruction, determining whether the group of instructions corresponding to the subsequent instruction comprises a load instruction; and
  in response to determining that the group of instructions corresponding to the subsequent instruction comprises a load instruction, setting a trouble_bit in an entry in the global completion table corresponding to the group of instructions and setting a younger_load_dispatched bit in the entry in the global completion table corresponding to the group of instructions.

14. A processor, comprising:
  first hardware logic, in an instruction sequencer unit of the processor, configured to dispatch a sync instruction;
  second hardware logic, in the instruction sequencer unit, configured to send the sync instruction to a nest of one or more devices outside of the processor;
  third hardware logic, in the instruction sequencer unit, configured to dispatch a subsequent instruction after dispatching the sync instruction, wherein the dispatching of the subsequent instruction after dispatching the sync instruction is performed prior to receiving a sync acknowledgement response from the nest; and
  fourth hardware logic, in the instruction sequencer unit, configured to perform a completion of execution of the subsequent instruction and update of an architected state by committing results of the execution of the subsequent instruction to memory, based on whether completion of the subsequent instruction is dependent upon receiving the sync acknowledgement from the nest and completion of the sync instruction, wherein the subsequent instruction is one of a store instruction or a load instruction, and wherein:
  in response to the subsequent instruction being a store instruction, the fourth hardware logic is configured to perform completion of execution of the subsequent instruction and update of the architected state at least by completing execution of the store instruction and updating the architected state by committing results of the execution of the store instruction to memory, after completion of the sync instruction but prior to receiving the sync acknowledgement from the nest, and
  in response to the subsequent instruction being a load instruction, the fourth hardware logic is configured to perform completion of execution of the subsequent instruction and update of the architected state at least by delaying completion of the execution of the subsequent instruction until after completion of the sync instruction and after receiving the sync acknowledgement from the nest, wherein the fourth hardware logic performs completion of execution of the subsequent instruction and updating of the architected state at least by determining whether a younger load instruction was dispatched while the sync instruction is pending, and updating a global completion table to indicate the subsequent instruction is dependent upon the sync instruction acknowledgement in response to a younger load instruction not having been dispatched after the sync instruction.

15. The processor of claim 14, wherein, in response to the subsequent instruction being a load instruction and in response to receiving the sync acknowledgement from the nest, the fourth hardware logic is configured to perform completion of execution of the subsequent instruction and update of the architected state further by:
  checking, by a load store unit of the processor, for a snoop hit on the load instruction;
  in response to there not being a snoop hit on the load instruction, completing execution of the load instruction; and
  in response to there being a snoop hit on the load instruction, requesting, by the load store unit, a flush of a processor pipeline at a point of an oldest snooped load instruction that is younger than the sync instruction.

16. The processor of claim 14, wherein all subsequent instructions that are non-load/non-sync instructions younger than the sync instruction are permitted to complete execution and update the architected state without waiting to receive the sync acknowledgement.

17. The processor of claim 14, wherein the first hardware logic is further configured to set a sync pending status bit, and wherein the third hardware logic is further configured to dispatch a subsequent instruction after dispatching the sync instruction by setting a status bit corresponding to the dispatched subsequent instruction.

18. The processor of claim 17, wherein:
  performing a completion of execution of the subsequent instruction and update of the architected state comprises determining if a next to complete instruction is a load instruction or a sync instruction;
  in response to a next to complete instruction being a load instruction or a sync instruction, determining if the sync pending status bit is set or not; and
  completing, or stalling completion, of execution of the subsequent instruction and updating the architected state based on results of determining if the sync pending status bit is set or not.

19. The processor of claim 18, wherein if the sync pending status bit is set, then completion of execution of the subsequent instruction and update of the architected state is stalled until the sync acknowledgement pending bit is reset.

20. The processor of claim 18, wherein if the sync pending status bit is not set, then completion of execution of the subsequent instruction and update of the architected state is performed and the sync acknowledgement bit is reset.

21. An apparatus, comprising:
  a processor; and
  a nest of one or more devices external to the processor, wherein the processor comprises hardware logic configured to:
  dispatch a sync instruction;
  send the sync instruction to the nest of one or more devices external to the processor;
  dispatch a subsequent instruction after dispatching the sync instruction, wherein the dispatching of the subsequent instruction after dispatching the sync instruction is performed prior to receiving a sync acknowledgement response from the nest; and
  perform a completion of execution of the subsequent instruction and update of an architected state by committing results of the execution of the subsequent instruction to memory, based on whether completion of the subsequent instruction is dependent upon receiving the sync acknowledgement from the nest and completion of the sync instruction, wherein the subsequent instruction is one of a store instruction or a load instruction, and wherein:

in response to the subsequent instruction being a store instruction, performing completion of execution of the subsequent instruction and update of the architected state comprises completing execution of the store instruction and updating the architected state by committing results of the execution of the store instruction to memory, after completion of the sync instruction but prior to receiving the sync acknowledgement from the nest, and in response to the subsequent instruction being a load instruction, performing completion of execution of the subsequent instruction and update of the architected state comprises delaying completion of the execution of the subsequent instruction until after completion of the sync instruction and after receiving the sync acknowledgement from the nest, wherein performing the completion of execution of the subsequent instruction and updating of the architected state comprises determining whether a younger load instruction was dispatched while the sync instruction is pending, and updating a global completion table to indicate the subsequent instruction is dependent upon the sync instruction acknowledgement in response to a younger load instruction not having been dispatched after the sync instruction.

* * * * *